United States Patent [19]
Hauser

[11] Patent Number: 6,012,281
[45] Date of Patent: Jan. 11, 2000

[54] NOISE SUPPRESSING FLUID MIXING SYSTEM FOR A TURBINE ENGINE

[75] Inventor: Joseph R. Hauser, Vernon, Conn.

[73] Assignee: United Technologies Corporation, Hartford, Conn.

[21] Appl. No.: 08/914,604

[22] Filed: Aug. 18, 1997

[51] Int. Cl.[7] .................................. F02C 7/24; F02K 1/48
[52] U.S. Cl. ......................... 60/204; 60/262; 239/265.17
[58] Field of Search ........................... 60/204, 262, 39.5; 239/265.17; 181/220

[56] References Cited

U.S. PATENT DOCUMENTS

| | | | |
|---|---|---|---|
| 2,882,992 | 4/1959 | Hausmann | 181/60 |
| 2,944,624 | 7/1960 | Morley | 181/51 |
| 2,957,310 | 10/1960 | Hyde | 60/35.6 |
| 2,959,917 | 11/1960 | McGehee | 60/35.6 |
| 3,002,341 | 10/1961 | Muzzy et al. | 60/35.6 |
| 3,041,836 | 7/1962 | Truman et al. | 60/39.69 |
| 3,065,818 | 11/1962 | Lombard et al. | 181/33 |
| 3,153,319 | 10/1964 | Young et al. | 60/35.6 |
| 3,227,240 | 1/1966 | Lee et al. | 181/51 |
| 3,415,337 | 12/1968 | Karasievich | 181/51 |
| 3,463,402 | 8/1969 | Langston, Jr. | 239/265.13 |
| 3,592,291 | 7/1971 | Medawar et al. | 181/33 HC |
| 3,826,331 | 7/1974 | Scharton et al. | 181/33 HC |
| 4,095,417 | 6/1978 | Banthin | 60/39.5 |
| 4,149,375 | 4/1979 | Wynosky et al. | 60/262 |
| 4,226,085 | 10/1980 | Johnson | 60/262 |
| 4,302,934 | 12/1981 | Wynosky et al. | 60/262 |
| 4,401,269 | 8/1983 | Eiler | 239/265.17 |
| 4,819,425 | 4/1989 | Farquhar et al. | 60/226.1 |
| 4,926,633 | 5/1990 | Nash et al. | 60/226.1 |
| 5,291,672 | 3/1994 | Brown | 60/262 |
| 5,381,655 | 1/1995 | Orlando et al. | 60/226.3 |
| 5,761,900 | 6/1998 | Presz | 239/265.17 |

*Primary Examiner*—Louis J. Casaregola
*Attorney, Agent, or Firm*—Kenneth C. Baran

[57] ABSTRACT

The invention is a method and apparatus for combining two fluid streams, for example concentric inner (42) and outer (44) fluid streams in a turbine engine, thereby reducing noise emissions of the engine. A mixing system (12) according to the invention has a convoluted mixer body (18) and a fluid communication path (88) situated forwardly of a main mixing zone (54) for inducing a small quantity of fluid to flow from one of the streams and into the other of the streams in response to a differential pressure between the streams. In one specific embodiment, the fluid communication path (88) is a series of circumferentially distributed crossover apertures (92) forwardly of the leading edge (48) of the mixer body (18). In operation, the mixing system circumferentially interleaves the inner and outer streams of a turbine engine and introduces a quantity of fluid from one of the streams into the other of the streams, the fluid introduction occurring prior to or concurrently with the interleaving. The interleaved streams are then combined into a mixed, aggregate stream in the main mixing zone.

23 Claims, 12 Drawing Sheets

NOISE SUPPRESSING FLUID MIXING SYSTEM FOR A TURBINE ENGINE

TECHNICAL FIELD

This invention pertains to fluid mixing devices for combining two or more fluid streams, and particularly to a noise suppressing mixing system for mixing inner and outer fluid streams in a turbine engine.

BACKGROUND OF THE INVENTION

Noise emissions from turbine engines, particularly those used to power aircraft, are an important environmental concern. Many industrialized countries already impose restrictions on turbine engine noise emissions, and it appears likely that noise restricting regulations will become increasingly stringent and more geographically widespread in future years. Recent generation engines incorporate advanced noise suppression technologies to ensure that their noise emissions are within regulatory limits. Older generation engines, however, were designed in a more permissive era and it has been necessary to acoustically upgrade these engines to bring them into regulatory compliance. However the acoustic upgrades are expensive and almost invariably diminish engine efficiency. Moreover, as noise regulations become increasingly strict, it can become inordinately difficult and prohibitively expensive to introduce further acoustic upgrades into older generation engines. As a result, many of these engines may have to be retired from service despite being serviceable in all other respects.

One type of older generation turbine engine that remains popular and widely used even today, is a mixed flow turbofan engine. Acoustically upgraded versions of these engines have an exhaust system that includes a convoluted or lobed mixer. The mixer is circumscribed by an engine case that extends longitudinally aftwardly of the mixer. In operation, the mixer causes an inner stream of high temperature, high velocity core gases to mix with an outer, concentric stream of relatively cool, lower velocity air. The partially mixed gas stream, which has an average velocity intermediate that of the inner and outer streams, is then expelled through an exhaust nozzle. Since exhaust noise emissions are proportional to the eighth power of velocity, the lobed mixer's ability to decelerate the core gases by mixing those gases with the lower velocity concentric air stream makes the lobed mixer highly effective as an exhaust noise suppressor.

As increasingly strict noise regulations have been imposed, various improvements to the basic lobed mixer have been devised. Among these improvements are mixers having an increased quantity of lobes, and the unique double lobed mixer described in U.S. Pat. No. 5,638,675 to Zysman et al., and commonly assigned to the assignee of the present application. However efficacious these improved mixers may be, they are not without their shortcomings. Their larger surface area, in comparison to that of the basic lobed mixer, results in increased skin friction and aerodynamic drag, leading to diminished engine efficiency and degraded aircraft performance. The geometric complexity of the improved mixers also escalates the costs associated with their manufacture. Moreover, engines that have been fitted with the basic lobed mixer can only benefit from the improvements if the basic mixer is replaced with one of the improved mixers—an expensive and therefore unappealing option.

A further potential drawback of lobed mixers arises from fluid shearing that occurs at the juncture of the high and low velocity streams. While the admixture of the fluid streams diminishes acoustic energy amplitudes at the low frequency end of the noise spectrum, the fluid shearing can increase the energy amplitudes at higher frequencies. As a rule, higher frequency spectral components propagate less readily than lower frequency components, but they are also more annoying and therefore are particularly undesirable. The U.S. Government's formula for quantifying turbine engine noise emissions penalizes the presence of the higher frequency components by assigning high weighting factors to those components. Existing lobed mixers (including the basic lobed mixer and the improved versions described above) are carefully designed to capture the benefits of low frequency noise reduction while not amplifying the higher frequencies enough to exceed the regulatory threshold. Nevertheless, any modification of an existing mixer with intent to improve its acoustic characteristics carries the risk of upsetting this carefully crafted balance.

SUMMARY OF THE INVENTION

It is, therefore, a primary object of the present invention to improve the acoustic characteristics of a fluid mixing system having a lobed mixing body, and to do so without introducing undue complexity into the mixing system. It is a further object to achieve the improved acoustic characteristics with, at most, little or no amplification of the higher, more annoying acoustic frequencies. When the fluid mixing system is used in the exhaust system of an aircraft turbine engine, it is an additional object to improve the acoustic characteristics of the exhaust system without adversely affecting engine or aircraft performance. It is also an object, once again in the context of an aircraft turbine engine, to provide acoustic improvements that can be readily and inexpensively incorporated into engines already fitted with a lobed mixer.

According to the invention, a fluid mixing system includes a lobed mixer body for interleaving two fluid streams prior to discharging those streams into a main mixing zone, and a fluid communication path for inducing a quantity of fluid to flow from one of the streams into the other stream ahead of the main mixing zone so that noise emissions of the mixing system are reduced.

According to one aspect of the invention, the fluid communication path is a series of crossover apertures, and according to another aspect of the invention, the fluid communication path is a substantially uninterrupted crossover slot.

In one embodiment of the invention specifically adapted for use in an aircraft turbine engine, the mixing system includes a mixer body that establishes a boundary between radially inner and outer fluid streams. The mixer body has a leading edge, a trailing edge and a plurality of circumferentially alternating lobes and troughs, each having an origin and extending longitudinally to the trailing edge. Crossover apertures are situated longitudinally forwardly of the mixer body so that a differential pressure between the streams induces a quantity of fluid to flow from the inner stream into the outer stream thereby reducing the noise emissions of the engine.

In another detailed embodiment of the invention as applied to a turbine engine, a method of suppressing noise emissions includes the steps of incrementing the amount of fluid in the outer stream by diverting a quantity of fluid from the inner stream into the outer stream, guiding the streams into an interleaved relationship in the lobes and troughs of the mixer body, and combining the streams into a mixed, aggregate stream in a main mixing zone aft of the mixer body trailing edge.

The primary advantage of using the invention is the realization of noise levels lower than those attainable with a prior art lobed mixer. When the invention is integrated into the exhaust system of a turbine engine, the noise reduction is especially appealing since it is concentrated at acoustic frequencies that are particularly annoying and therefore are heavily penalized in formulas used for assessing regulatory compliance. The invention has little or no adverse effect on engine performance, engine operational characteristics or exhaust system complexity. Moreover, the invention can be easily and inexpensively incorporated into engines already having prior art lobed mixers.

The foregoing features and advantages and the operation of the invention will become more apparent in light of the following description of the best mode for carrying out the invention and the accompanying drawings.

BEST MODE FOR CARRYING OUT THE INVENTION

Figure 1:
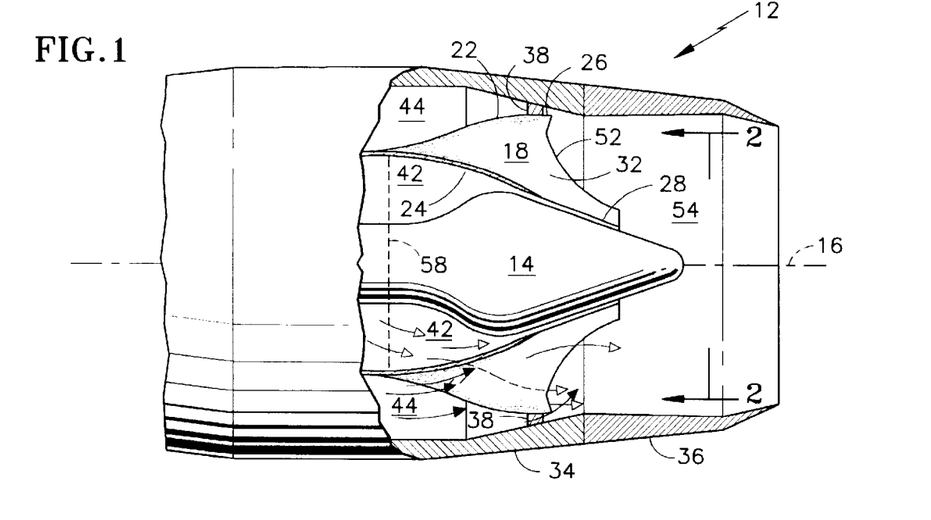
FIG. 1 is a side view of the aft end of a mixed flow turbofan engine partially cut away to expose an internal fluid mixing system that includes a mixer body having a series of circumferentially alternating lobes and troughs for mixing concentric inner and outer fluid streams.

FIG. 1 illustrates an exhaust mixing system 12 for a turbine engine. The engine has a centerbody 14 disposed about a longitudinally extending central axis 16. The exhaust system includes a mixer body 18 having undulations such as undulation 22 that diverges radially away from the central axis, and undulation 24 that converges radially toward the central axis. The divergent and convergent undulations define a plurality of transversely (i.e. circumferentially) alternating lobes 26 and troughs 28 joined together by substantially radially extending sidewalls 32. The exhaust system is circumscribed by an engine case 34 and an exhaust nozzle 36. A series of support struts 38 extends radially between the mixer body and the case to support the mixer body. The mixer body defines a boundary between a first, radially inner fluid stream 42 denoted by the open arrowheads, and a second, radially outer fluid stream 44 denoted by the solid arrowheads. The inner fluid stream is a stream of hot, high velocity combustion products, and the outer stream is a stream of relatively cool, relatively low velocity air. As seen best in FIG. 2, the mixer body causes the longitudinally flowing inner and outer streams to become circumferentially interleaved. It should be noted that the characterization of an undulation 22, 24 as either a lobe or a trough is a matter of perspective. A divergent undulation 22 is a lobe $L_o$ from the perspective of the outer stream and is a trough $T_i$ from the standpoint of the inner stream. Conversely, a convergent undulation 24 is a lobe $L_i$ from the perspective of the inner stream and is a trough $T_o$ from the viewpoint of the outer stream. For convenience and simplicity, the undulations are frequently referred to only from the perspective of the outer stream throughout this description. However no loss of generality in the appended claims is intended.

Figures 3, 4:
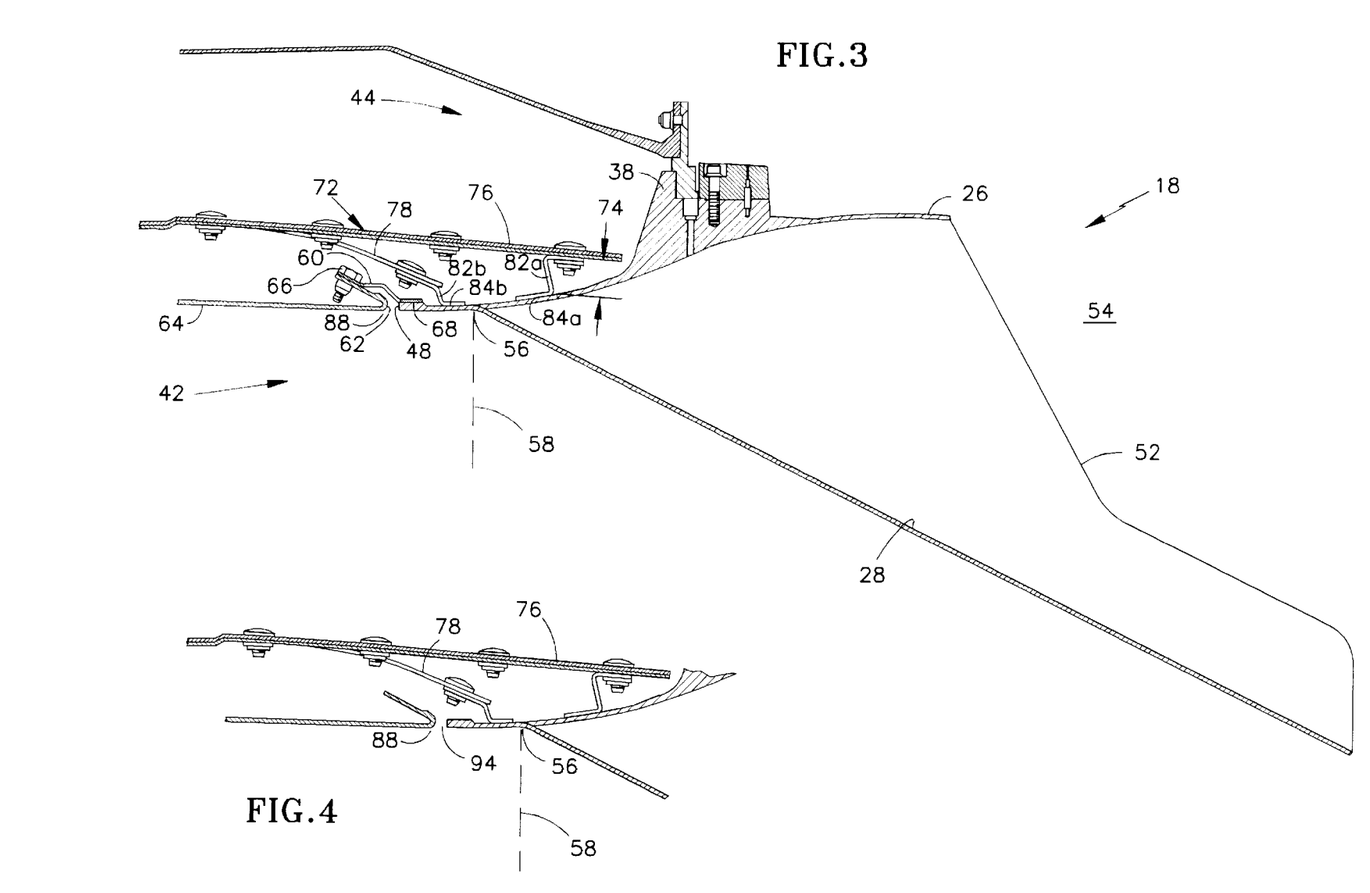
FIG. 3 is an enlarged side view of a portion of the exhaust mixing system of FIG. 1 showing a typical lobe and trough, a fluid communication path between the inner and outer streams and a fairing for guiding the outer stream over the lobes and into the troughs.
FIG. 4 is a view similar to that of FIG. 3 showing an alternative embodiment of the invention.
Figure 5:
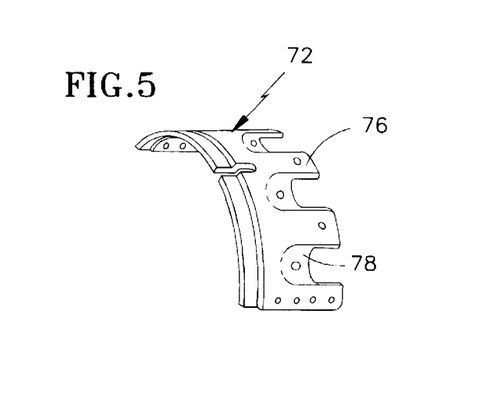
FIG. 5 is a perspective view of a circumferentially extending segment of the fairing of FIGS. 3 and 4.
Figure 6:
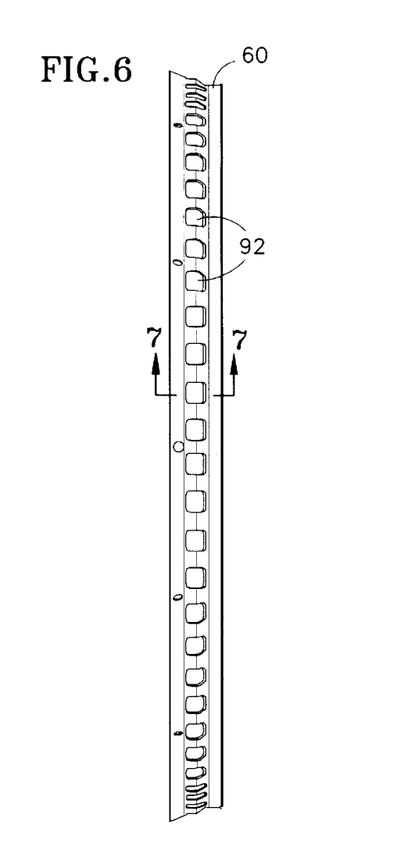
FIG. 6 is an enlarged view of a guide ring visible in FIG. 3.
Figure 7:
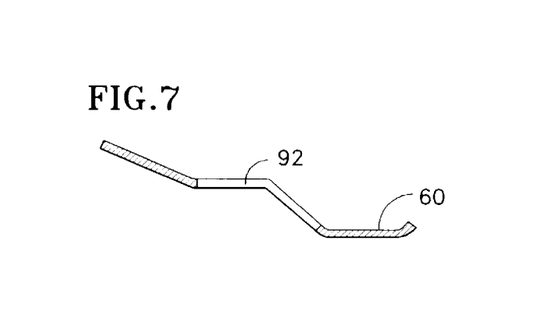
FIG. 7 is an enlarged view of the guide ring taken essentially in the direction 7—7 of FIG. 6.

Referring now to FIG. 3, the mixer body 18 has a leading edge 48 and a trailing edge 52, the trailing edge defining the longitudinally forwardmost extremity of a main mixing zone 54. Each lobe 26 and trough 28 has an origin 56, the origins collectively defining a circumferentially extending origin locus 58. The lobes and troughs extend longitudinally from their origins 56 to the mixer body trailing edge 52. A guide ring 60, seen in better detail in FIGS. 6 and 7, spans across opening 62 between the forward end of the mixer body and the aft end of a turbine exhaust case 64 to support the forward end of the mixer body. The guide ring 60 is connected to the turbine exhaust case 64 by a series of fasteners 66. The aft end of the guide ring circumscribes the forward end of the mixer body to form a light interference joint 68. A fairing 72, comprising multiple circumferentially extending segments, one of which is illustrated in FIG. 5, has circumferentially alternating ramps 76 and chutes 78 aligned respectively with the lobes and troughs of the mixer body to guide the outer stream smoothly over the lobes and into the troughs. The fairing is supported from the mixer body by a set of circumferentially distributed brackets 82a, 82b. The brackets are bolted to the ramps and chutes and are connected to the mixer body at welded connections 84a, 84b to support the aft end of the fairing. The turbine exhaust case 64 and the mixer body 18 define a radially outer boundary of the first or inner stream 42 and a radially inner boundary of the second or outer stream 44.

The mixing system also includes a fluid communication path 88 between the first and second streams and situated forwardly of the main mixing zone 54. The fluid communication path is also longitudinally situated so that a differential pressure between the streams induces a quantity of fluid to flow from one of the streams into the other of the streams. In the preferred embodiment, as seen best in FIGS. 6 and 7, the fluid communication path is a series of circumferentially distributed crossover apertures 92 in the guide ring 60. Alternatively, the fluid communication path may be a substantially circumferentially uninterrupted crossover slot 94 as shown in FIG. 4. A crossover slot can be provided by dispensing with the guide ring 60 thereby taking advantage of the opening 62 between the turbine exhaust case 64 and the mixer body 18. However since the guide ring helps to support the mixer body, the alternative embodiment may also require a surrogate support to compensate for the absence of the guide ring.

Each crossover aperture 92 is longitudinally situated forwardly of the origin locus 58. Since the apertures extend through the guide ring 60, they are situated forwardly of the mixer body leading edge 48 as well. Likewise, the crossover slot 94 of the alternative embodiment is situated forwardly of the origin locus and forwardly of the mixer body leading edge. As explained more fully below, this forward positioning of the apertures or the slot may be beneficial. Moreover, experimental testing suggests that circumferential alignment of the crossover apertures with the troughs of the outer stream may also be advantageous.

In operation, the first and second fluid streams 42, 44, which are substantially mutually isolated from each other by the turbine exhaust case 64 and the mixer body 18, flow longitudinally through the engine. A differential pressure between the streams induces a small quantity of fluid to flow from one of the streams and to be introduced into the other stream by way of the fluid communication path 88. The streams, one of them decremented by the quantity of fluid and the other of them incremented by the quantity of fluid, are guided into the mixer body where they are circumferentially interleaved. The introduction of fluid may precede the interleaving of the streams, as in the illustrated embodiments of FIGS. 3 and 4, or may take place concurrently with the interleaving. The interleaved, decremented and incremented streams are then discharged from the mixer body and into the main mixing zone 54 where they combine into a mixed aggregate stream. As is the case with a conventional lobed mixer, the circumferential interleaving promotes partial mixing of the streams in the main mixing zone thereby suppressing exhaust noise emissions. Unlike the conventional mixer, however, the mixer of the present invention introduces a quantity of fluid from one of the streams into the other of the streams in response to a differential pressure between the streams thereby reducing exhaust noise emissions to levels lower than are attainable with the conventional mixer. While the underlying mechanisms responsible for the reduced noise emissions are not thoroughly understood, it is believed that the quantity of fluid diverted from one stream and introduced into the other stream undergoes small scale pre-mixing with the fluid in the other stream, and that the noise reduction is attributable to this small scale pre-mixing. Hence, it may be beneficial to introduce the diverted fluid into the other stream as far forwardly of the main mixing zone as is reasonably possible, thereby maximizing the opportunity for thorough small scale pre-mixing.

In a turbine engine, the aforementioned fluid streams are a radially inner stream of hot, high velocity combustion products and a radially outer stream of relatively cool, relatively low velocity air. If the quantity of fluid diverted from one of the streams and introduced into the other of the streams is excessive, the operational characteristics of the engine may be unacceptably degraded. For example, in a typical turbine engine, the differential pressure induces a quantity of combustion products to flow from the inner stream 42 into the outer stream 44. If the introduced quantity of combustion products is excessive, the aeroelastic stability of the fan airfoils (not shown) located at the forward end of the outer stream can be compromised. As a further example, the elevated temperature of hot combustion products introduced into the outer stream can diminish the operational life of parts, such as the fairing 72, that are designed for a cooler environment. Therefore, the quantity of fluid induced to flow from one stream and into the other stream is selected to be sufficient to reduce noise emissions of the engine without unacceptably affecting its other operational characteristics.

In the embodiment illustrated in FIG. 3, fluid is induced to flow from the inner stream into the outer stream, and a fluid quantity of approximately one percent of the amount (i.e. mass flow rate) of fluid flowing in the inner stream has been found to be effective. In the illustrated embodiment, the mass flow rate of fluid from the inner stream to the outer stream is regulated by the area of annular gap 74 between the fairing and the mixer body.

Figure 2:
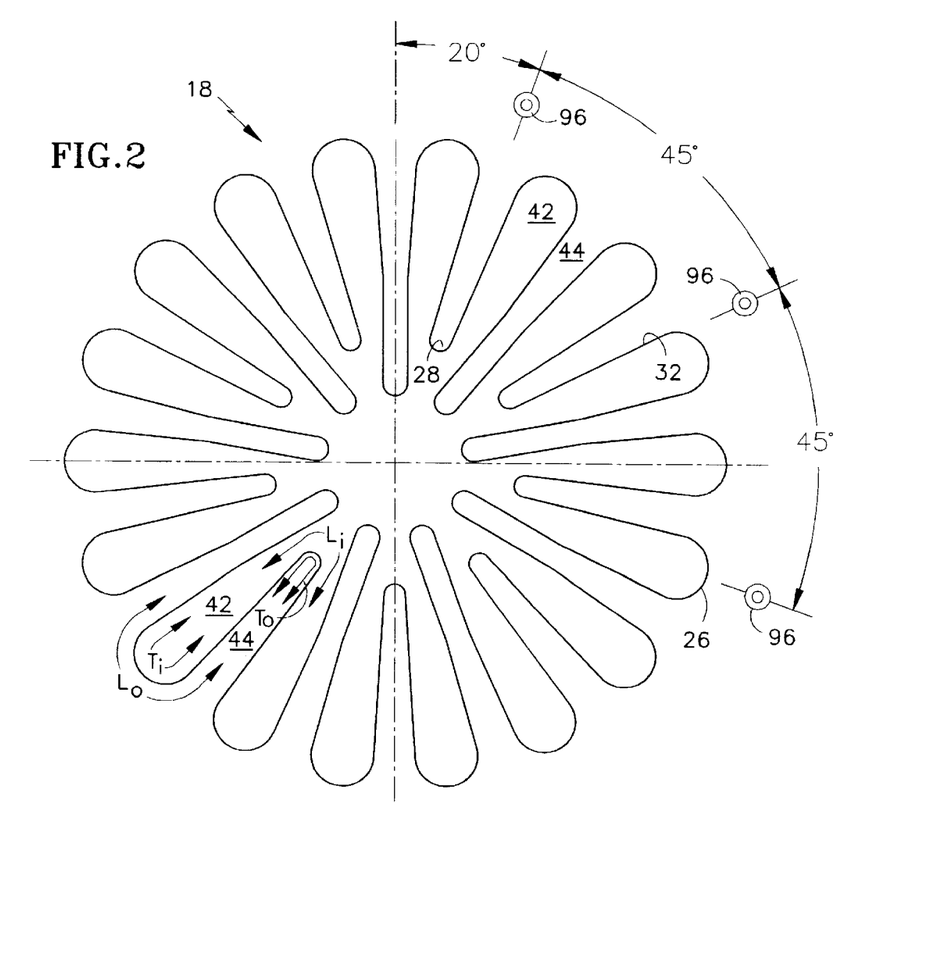
FIG. 2 is a view of the mixer body taken essentially in the direction 2—2 of FIG. 1.
Figure 9A:
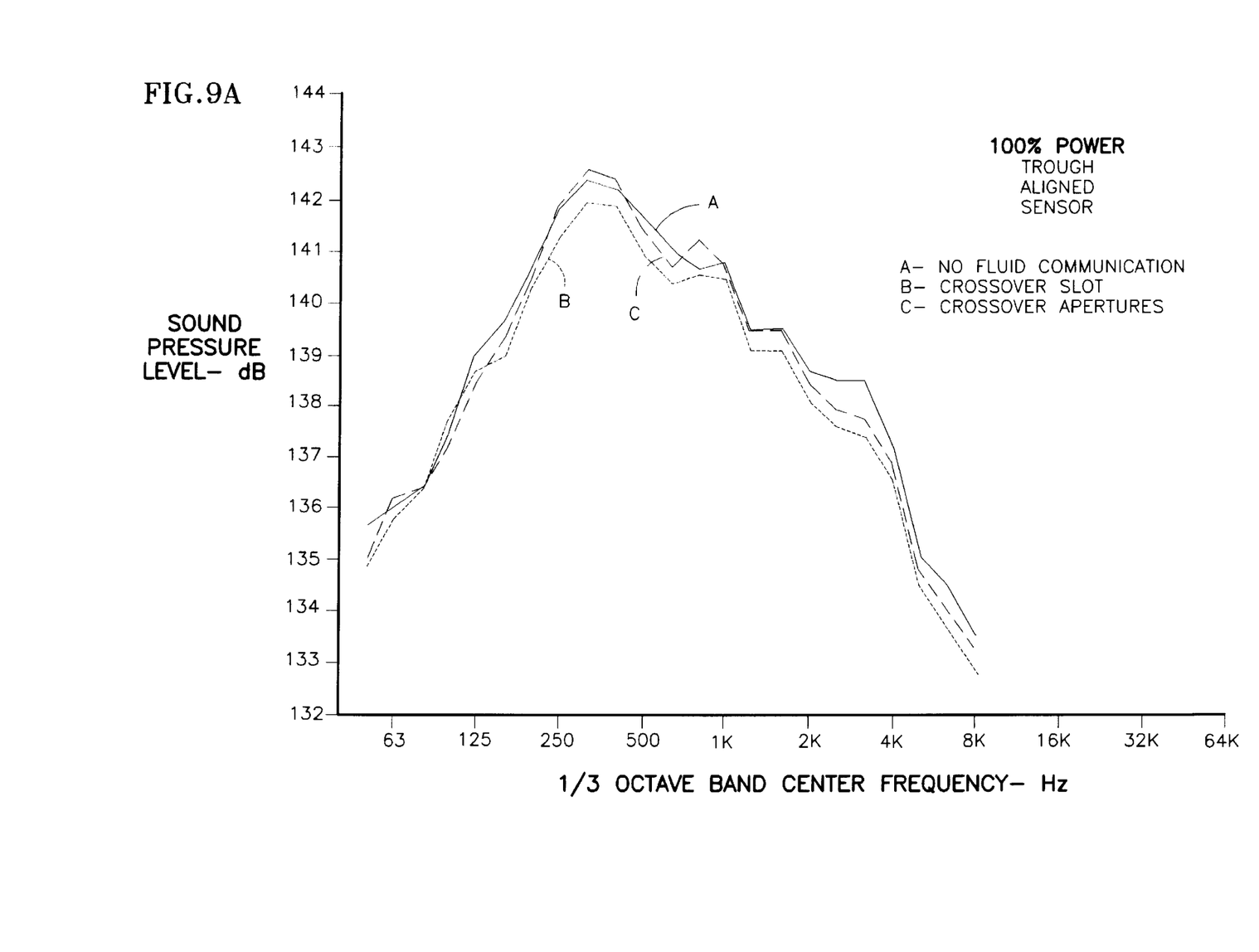
FIGS. 9A–9C, 10A–10C, and 11A–11C are graphical presentations of engine test data at each of three engine power levels comparing the acoustic performance of a prior art mixing system to the acoustic performance of two embodiments of the mixing system of the present invention.
Figure 9B:
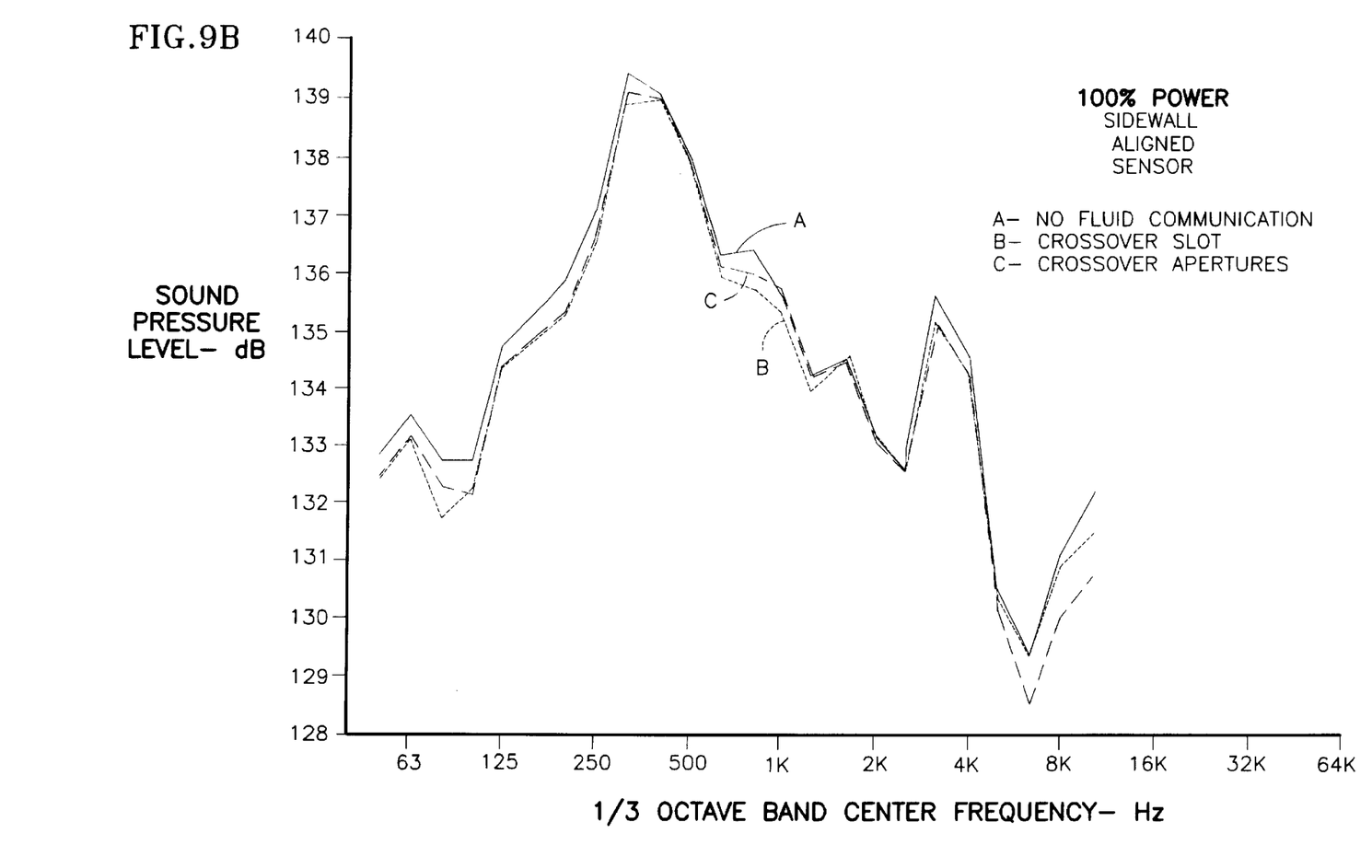
Figure 9C:
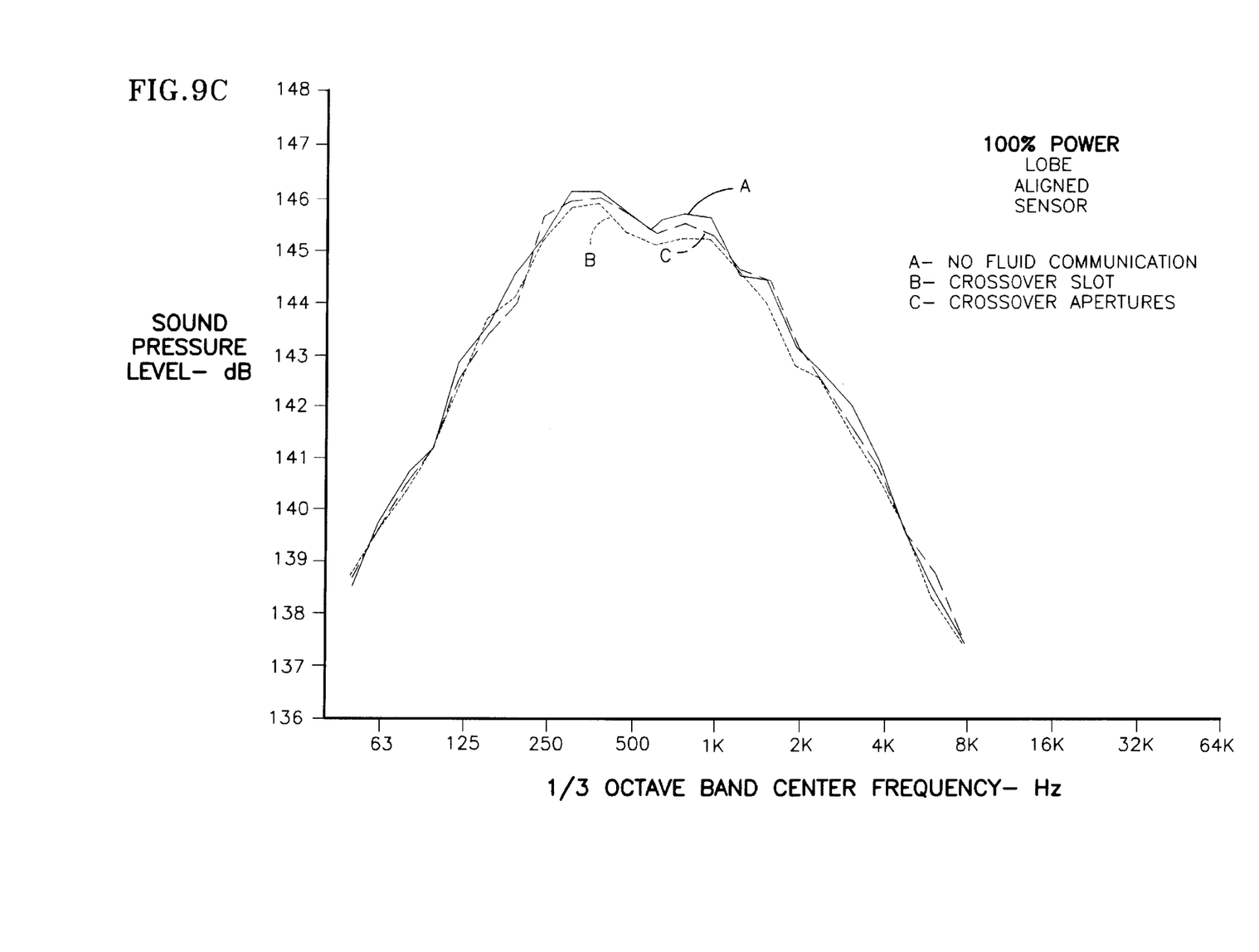
Figure 10A:
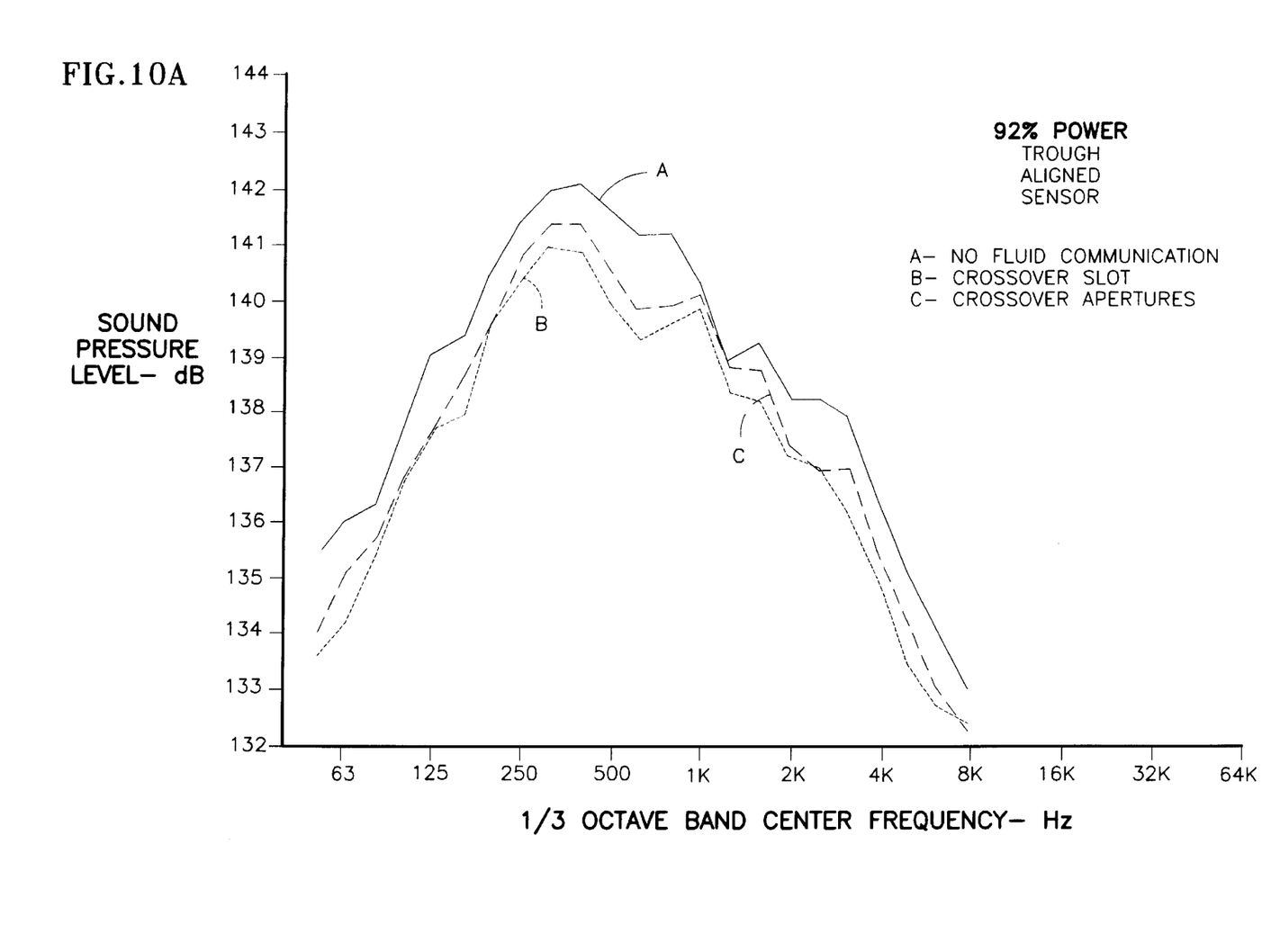
Figure 10B:
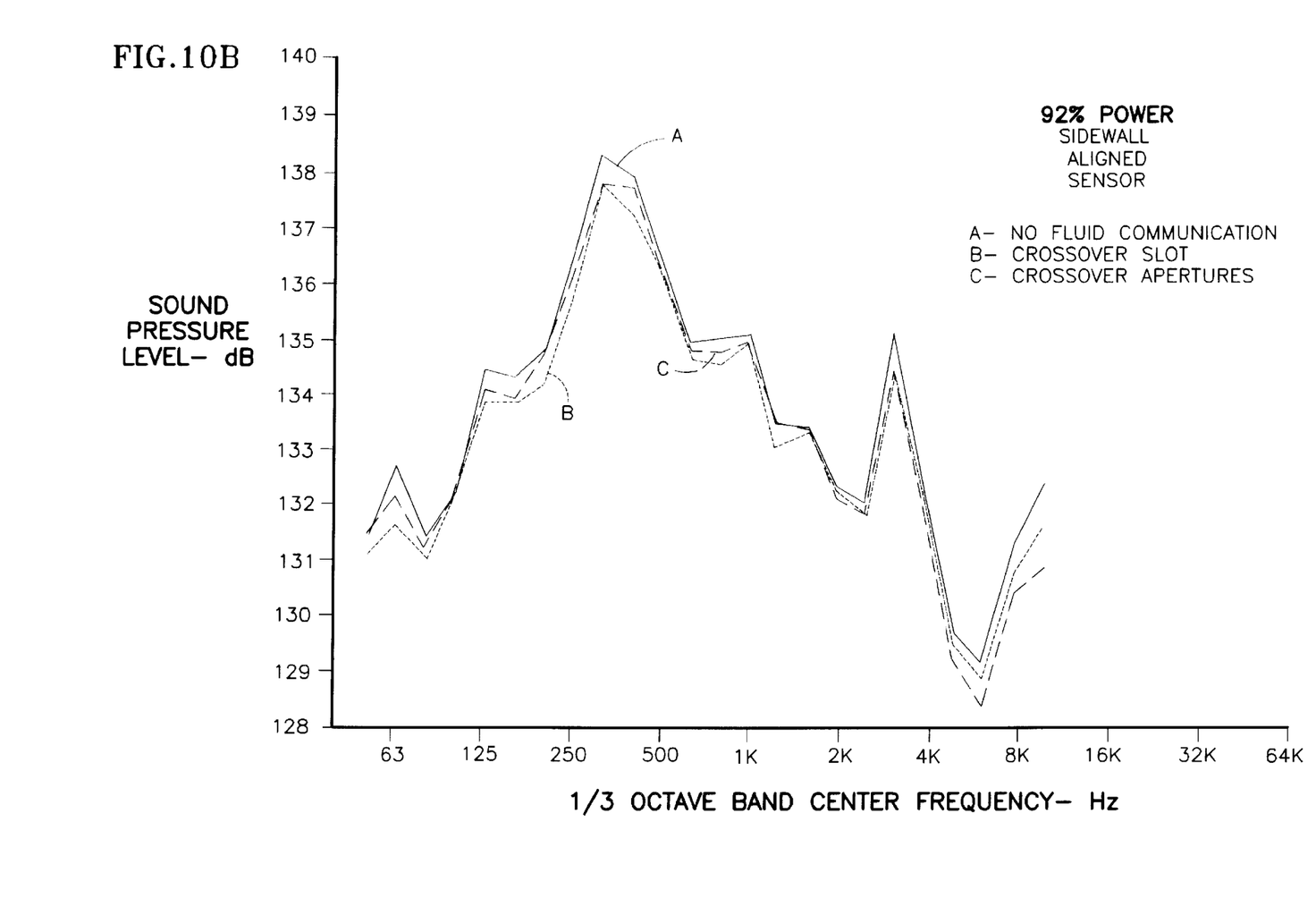
Figure 10C:
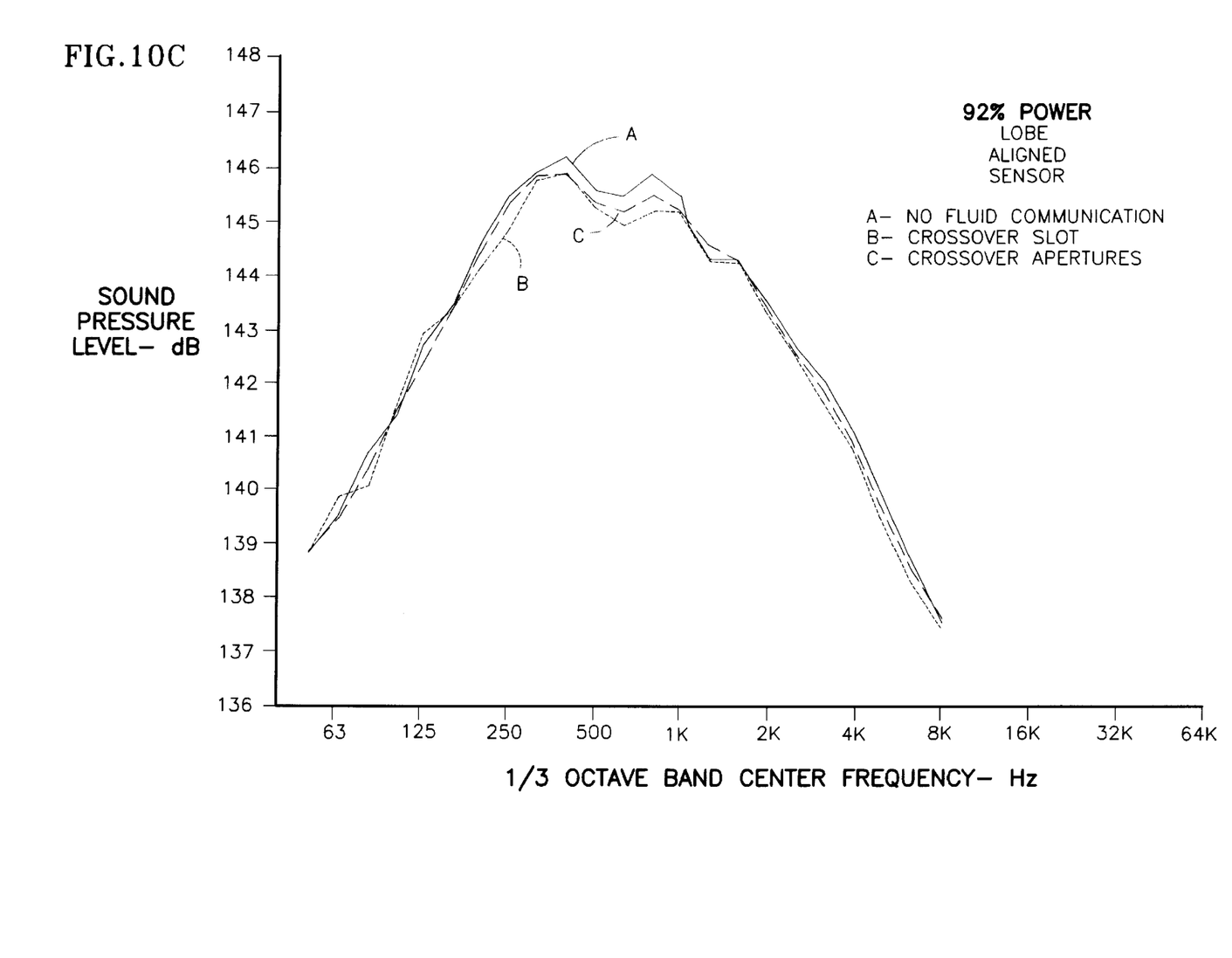
Figure 11A:
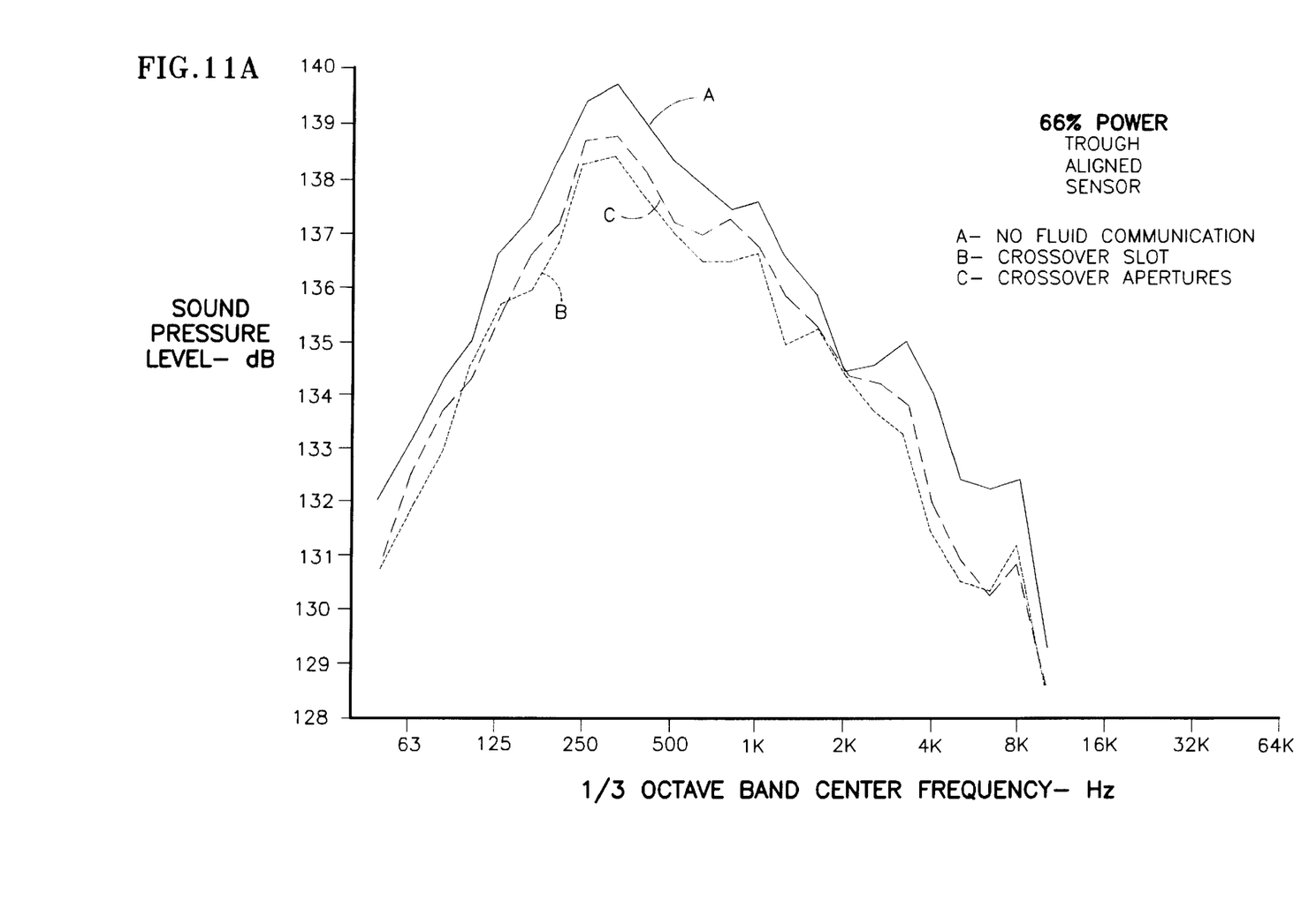
Figure 11B:
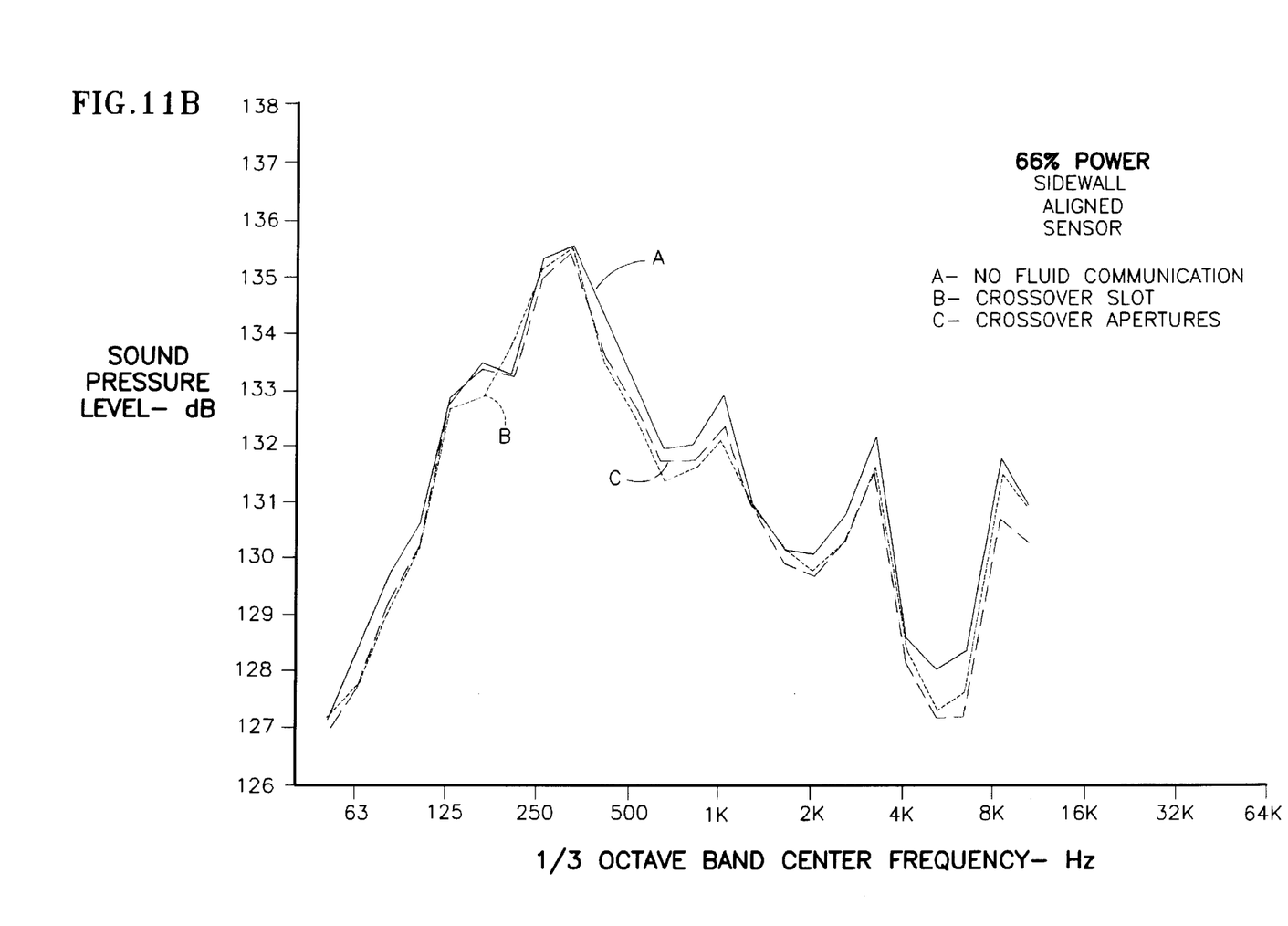
Figure 11C:
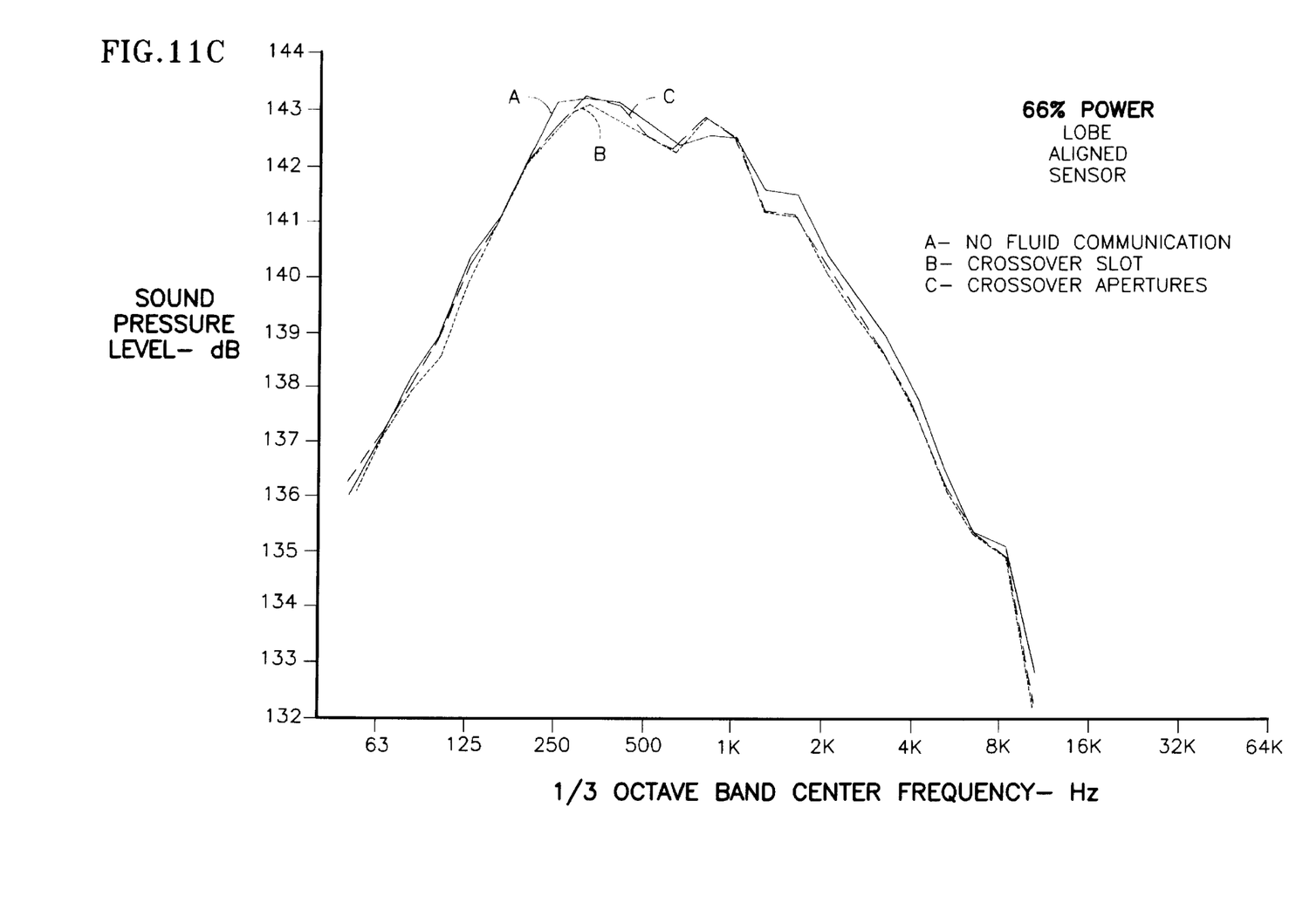

The graph triplets of FIGS. 9–11 illustrate the beneficial effect of the invention as observed during experimental testing of a mixed flow turbofan aircraft engine with an mixer body having eighteen lobes as seen in FIG. 2. The testing was conducted with sound pressure transducers 96 positioned in circumferential alignment with a lobe 26, with a trough 28 and with a sidewall 32. The test results with the engine operating at a power level equivalent to 100% takeoff thrust of an older generation turbine engine (specifically the JT8D-15 model engine manufactured by the assignee of the present application) are shown in the graphs of FIG. 9. The abscissa on each graph, (one third octave band center frequency depicted on a logarithmic scale) is a commonly used acoustic parameter that represents a bandwidth or range of frequencies on either side of each illustrated center frequency. The ordinate on each graph is sound pressure level, a logarithmic representation of the acoustic energy present in the indicated frequency range. Specifically, the ordinate is $20[\log_{10}(P/P_{REF})]$ where P is a sound pressure measured by a transducer 96 and $P_{REF}$ is a reference pressure of 20 micropascals (usually thought of as the "threshold of hearing"). For example, the data points at the 1000 hertz center frequency represent the acoustic energy content of a frequency band extending from 891 hertz to 1122 hertz. Each graph shows the sound pressure level with a crossover slot (line "B") and a series of crossover apertures (line "C") situated immediately forwardly of the mixer body leading edge. The sound pressure level observed with no fluid communication path between the fluid streams is shown by line "A". As seen in the figure, a reduction in sound pressure level is associated with the test configurations having either crossover apertures or a crossover slot. The noise reduction evident in the frequency range of about 500 Hz. to 4000 hertz is especially noteworthy since noise emissions in this frequency range are heavily penalized in the formulas used by the U.S. Government to assess regulatory compliance. Experimental test results taken with the engine operating at power levels of about 92% and 66% of takeoff thrust are shown in FIGS. 10 and 11 respectively.

Figure 8:
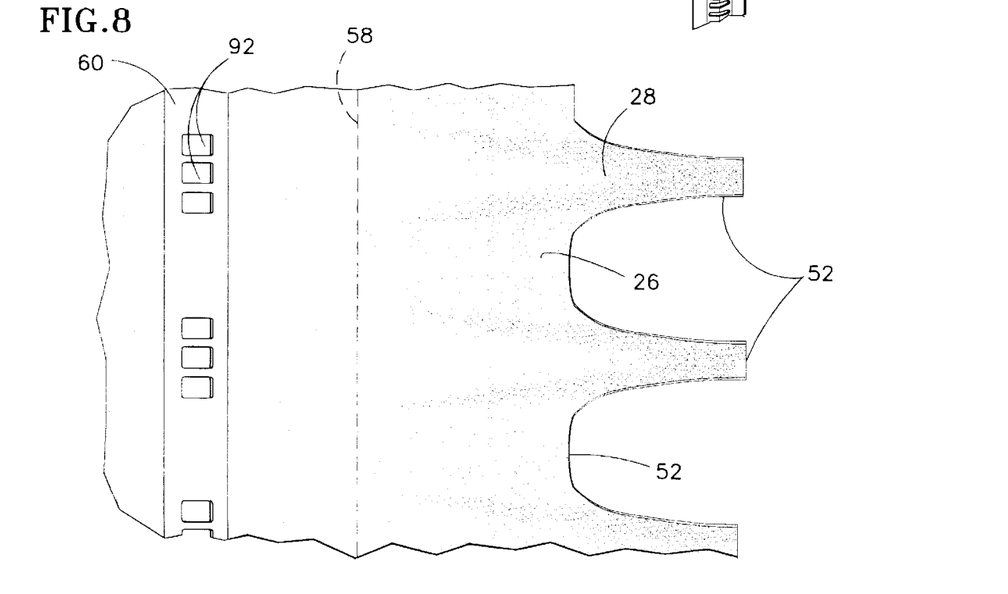
FIG. 8 is a schematic, developed view of a portion of the mixing system of the present invention showing the fluid communication path as exemplified by crossover apertures selectively distributed to be in circumferential alignment with the mixer body troughs.

FIGS. 9–11 also show that the sound pressure level reduction is greatest as determined by the pressure transducer circumferentially aligned with a trough in the outer fluid stream. This observation suggests, albeit not conclusively, that circumferentially selective fluid introduction may be beneficial. Accordingly, a mixing system having crossover apertures substantially transversely (i.e. circumferentially) aligned with the troughs of the stream into which the fluid quantity is introduced (FIG. 8) may be advantageous.

The invention is easily and inexpensively incorporated into engines that were originally designed in an era when noise regulations were nonexistent or, by present standards, were far less stringent. Significantly, the invention can also be readily retrofit into engines that are already in service. For example, an engine having a lobed mixer can be fitted with an apertured guide ring 60 in lieu of the conventional, nonapertured guide ring that customarily spans across opening 62. Alternatively, the guide ring can be dispensed with entirely, provided that the mixer body 18 is adequately supported.

The invention has been described in the context of a mixed flow turbine engine having concentric fluid streams, the outermost of which is bounded by an engine case 34. However the invention also embraces devices and methods for mixing fluid streams one of which is unbounded. Moreover, the invention comprehends devices for mixing nonconcentric fluid streams, for example fluid streams flowing through parallel ducts not necessarily of circular cross section. These and other changes and modifications can be made without departing from the invention as set forth in the accompanying claims.

I claim:

1. A noise suppressing mixing system for mixing first and second fluid streams, comprising:

a mixer body defining a boundary between the first and second fluid streams;

the mixer body having a leading edge and a trailing edge, the trailing edge defining the forwardmost extremity of a main mixing zone, the mixer body having a plurality of alternating lobes and troughs, each lobe and trough having an origin and extending longitudinally from the origin to the trailing edge, the lobe and trough origins collectively defining an origin locus;

the mixing system having a fluid communication path between the first and second streams to induce a quantity of fluid to flow from one of the streams at a location longitudinally forwardly of the origin locus and into the other of the streams.

2. The mixing system of claim 1 wherein the fluid communication path comprises a series of crossover apertures.

3. The mixing system of claim 2 wherein the crossover apertures are longitudinally situated forwardly of the leading edge.

4. The mixing system of claim 2 wherein the apertures are substantially circumferentially aligned with the troughs of the other stream.

5. The mixing system of claim 1 wherein the fluid communication path comprises a substantially uninterrupted crossover slot.

6. The mixing system of claim 5 wherein the crossover slot is longitudinally situated forwardly of the leading edge.

7. The mixing system of claim 1 wherein the quantity of fluid induced to flow into the other stream pre-mixes with the fluid in the other stream.

8. The mixing system of claim 1 wherein the fluid streams are radially inner and outer streams in a turbine engine and the quantity of fluid is induced to flow from the inner stream to the outer stream.

9. The mixing system of claim 1 wherein the fluid streams are radially inner and outer streams in a turbine engine, and the quantity of fluid induced to flow from the one stream into the other stream is sufficient to reduce noise emissions of the engine without unacceptably affecting other operational characteristics of the engine.

10. The mixing system of claim 9 wherein fluid is induced to flow from the inner stream to the outer stream and the quantity of fluid is approximately one percent of the amount of fluid flowing in the inner stream.

11. A noise suppressing mixing system for mixing concentric inner and outer fluid streams in a turbine engine, comprising:

a mixer body defining a radially outer boundary of the inner stream and a radially inner boundary of the outer stream, the mixer body having a leading edge and a trailing edge, the trailing edge defining the forwardmost extremity of a main mixing zone, the mixer body having a plurality of circumferentially alternating lobes and troughs, each lobe and trough having an origin and extending longitudinally from the origin to the trailing edge, the origins collectively defining a circumferentially extending origin locus;

the mixing system having a series of circumferentially distributed crossover apertures longitudinally situated forwardly of the leading edge so that a differential pressure between the streams induces a quantity of fluid to flow from the inner stream into the outer stream thereby reducing noise emissions of the engine.

12. A method of mixing longitudinally flowing, substantially mutually isolated first and second fluid streams, comprising:

introducing a quantity of fluid from one of the streams into the other of the streams thereby incrementing the amount of fluid in the one stream and decrementing the amount of fluid in the other stream;

interleaving the streams; and combining the interleaved, decremented and incremented streams into a mixed aggregate stream;

wherein the incrementing and decrementing of the streams precedes any substantial interleaving of the stream.

13. The method of claim 12 wherein the quantity of fluid from the one stream is circumferentially selectively introduced into the other stream.

14. The method of claim 12 wherein the quantity of fluid introduced into the other stream mixes with the fluid in the other stream.

15. The method of claim 12 wherein the fluid streams are radially inner and outer streams in a turbine engine and the quantity of fluid is introduced into the outer stream.

16. The method of claim 12 wherein the fluid streams are radially inner and outer streams in a turbine engine and the introduced quantity of fluid is sufficient to reduce noise emissions of the engine without unacceptably affecting other operational characteristics of the engine.

17. The method of claim 16, wherein the fluid is introduced into the outer stream and the quantity of introduced fluid is approximately one percent of the amount of fluid flowing in the inner stream.

18. A method of suppressing noise emissions arising from mixing concentric inner and outer fluid streams in a turbine engine, the engine having a mixing system comprising a mixer body defining a radially outer boundary of the inner stream and a radially inner boundary of the outer stream, the mixer body having a leading edge and a trailing edge, the trailing edge defining the forwardmost extremity of a main mixing zone, the mixer body having a plurality of circumferentially alternating lobes and troughs, the method comprising:

introducing a quantity of fluid from the inner stream into the outer stream longitudinally forwardly of the leading edge so that the amount of fluid in the inner stream is decremented and the amount of fluid in the outer stream is incremented;

guiding the streams into the lobes and troughs whereby the streams are circumferentially interleaved; and combining the interleaved, decremented and incremented streams into a mixed, aggregate stream in the main mixing zone.

19. A fluid mixing system comprising a lobed mixer body having a lobe origin locus for interleaving two fluid streams prior to discharging those streams into a main mixing zone, and a fluid communication path for inducing a quantity of fluid to flow from one of the streams at a location longitudinally forwardly of the origin locus and into the other stream ahead of the main mixing zone.

20. A noise suppressing mixing system for mixing first and second fluid streams, comprising:

a mixer body defining a boundary between the first and second fluid streams;

the mixer body having a leading edge and a trailing edge, the trailing edge defining the forwardmost extremity of a main mixing zone, the mixer body having a plurality of alternating lobes and troughs, each lobe and trough having an origin and extending longitudinally from the origin to the trailing edge;

the mixing system having a fluid communication path between the first and second streams forward of the main mixing zone to induce approximately one percent of the fluid of one of the streams to flow into the other of the streams.

21. The mixing system of claim 20 wherein the streams are radially inner and outer streams and the fluid communication path induces the fluid to flow from the inner stream to the outer stream.

22. A method of mixing longitudinally flowing, substantially mutually isolated first and second fluid streams, comprising:

diverting approximately one percent of the fluid from one of the streams into the other stream thereby decrementing the amount of fluid in the one stream and incrementing the amount of fluid in the other stream;

interleaving the streams; and combining the interleaved, decremented and incremented streams into a mixed aggregate stream.

23. The method of claim 22 wherein the streams are radially inner and outer streams and the step of diverting fluid causes fluid to flow from the inner stream to the outer stream.

* * * * *